United States Patent
Dubreuille et al.

(10) Patent No.: US 8,054,774 B2
(45) Date of Patent: Nov. 8, 2011

(54) MULTI-SLOT PACKET DATA TRANSFER METHOD

(75) Inventors: Julien Dubreuille, Nailloux (FR); Cyril Bouvet, Toulouse (FR); Olivier Marco, Toulouse (FR)

(73) Assignee: Motorola Mobility, Inc., Libertyville, IL (US)

( * ) Notice: Subject to any disclaimer, the term of this patent is extended or adjusted under 35 U.S.C. 154(b) by 575 days.

(21) Appl. No.: 12/297,519

(22) PCT Filed: Mar. 14, 2007

(86) PCT No.: PCT/US2007/063934
§ 371 (c)(1),
(2), (4) Date: Oct. 17, 2008

(87) PCT Pub. No.: WO2007/124214
PCT Pub. Date: Nov. 1, 2007

(65) Prior Publication Data
US 2010/0142491 A1   Jun. 10, 2010

(30) Foreign Application Priority Data
Apr. 19, 2006   (EP) ..................................... 06300378

(51) Int. Cl.
*H04W 4/00*   (2009.01)

(52) U.S. Cl. ..................................................... 370/314

(58) Field of Classification Search ................. 370/310, 370/314, 319–330
See application file for complete search history.

(56) References Cited

U.S. PATENT DOCUMENTS

| | | | |
|---|---|---|---|
| 5,428,649 A | 6/1995 | Cecchi | |
| 5,687,194 A | 11/1997 | Paneth et al. | |
| 6,205,157 B1 * | 3/2001 | Galyas et al. | 370/503 |
| 6,298,092 B1 | 10/2001 | Heath et al. | |

(Continued)

FOREIGN PATENT DOCUMENTS
WO   2004047460 A2   6/2004

OTHER PUBLICATIONS

Ericsson, Clarification to Extended Dynamic Allocation for High Multislot Classes (3GPP TSG-German WG2 Meeting #16 GP-032183), Aug. 25, 2003, New York USA.

(Continued)

*Primary Examiner* — Andrew Lai
*Assistant Examiner* — Juvena Loo
(74) *Attorney, Agent, or Firm* — Sylvia Chen

(57) ABSTRACT

A multislot packet data transfer method (300) for a mobile station alters a transmission (370) of a radio block on a last transmission timeslot in a block period (320) immediately preceding an idle frame when the mobile station is in an allowed multislot configuration yet not able to perform normal Base Station Identification Code (BSIC) decoding. The method (300) also skips a last transmission burst in a frame immediately preceding an idle frame (330) in accordance with known extended search window techniques. The method contemplates various criteria (340) for determining when to alter the radio block, which include: whether an unacknowledged radio link control mode is used (350) and whether a robust coding scheme is used (360). The transmission can be altered (370) by completely skipping transmission of the radio block, by replacing the radio block on the last transmission timeslot with at least one dummy burst, by changing a transmission power level of that radio block, and/or by using a different coding scheme for that radio block.

16 Claims, 5 Drawing Sheets

U.S. PATENT DOCUMENTS

| | | | |
|---|---|---|---|
| 6,891,847 B1 * | 5/2005 | Gubbi | 370/442 |
| 6,904,279 B1 * | 6/2005 | Lilja et al. | 455/426.2 |
| 7,738,505 B2 * | 6/2010 | Chang | 370/507 |
| 7,864,899 B2 * | 1/2011 | Huotari | 375/343 |
| 2002/0097984 A1 | 7/2002 | Abecassis | |
| 2003/0026228 A1 * | 2/2003 | Jyrkka | 370/336 |
| 2003/0162549 A1 * | 8/2003 | Carlsson | 455/456 |
| 2003/0174645 A1 * | 9/2003 | Paratainen et al. | 370/229 |
| 2004/0152478 A1 * | 8/2004 | Ruohonen et al. | 455/502 |
| 2008/0049881 A1 * | 2/2008 | Huotari | 375/359 |

OTHER PUBLICATIONS

European Telecommunications Standards Institute (ETSI), Digital Cellular Telecommunications System (Phase 2+) Radio Subsystem Link Control (3GPP TS 45.008 v6.12.0 Release 6), Apr. 2005, Sophia-Antipo France.

Ericsson, Nortel, Alcatel, Combination of Extended Dynamic Allocation and USF-Granularity=4 (3GPP TSG-Geran WG2 Meeting #17 GP-032564), Nov. 17, 2003, Budapest Hungary.

* cited by examiner

MULTI-SLOT PACKET DATA TRANSFER METHOD

FIELD OF THE DISCLOSURE

This disclosure relates generally to multislot packet transfer mode in a GSM/EDGE (Global System for Mobile communications/Enhanced Data rate for GSM Evolution) wireless communication system, and especially to a multislot packet transfer method for use when the neighboring cell search window is extended.

BACKGROUND OF THE DISCLOSURE

According to GSM/EDGE standards promulgated by the 3rd Generation Partnership Project (3GPP), a mobile station (MS) is required to periodically search for, synchronize to, and verify the identity of adjacent cells in order to ensure mobility capability. This process, which we shall refer to as BSIC decoding, includes searching for the Frequency Correction CHannel (FCCH) that indicates a given frequency is used as a Broadcast Control CHannel (BCCH) of a particular adjacent base station, decoding a Synchronization CHannel (SCH) to finely adjust to the synchronization of the adjacent cell, and then verifying that the cell is the expected one (and not another cell using the same frequency) using the Base transceiver Station Identity Code (BSIC) broadcast on the SCH.

Unfortunately, the idle frame (also termed "search" frame) allocated to perform BSIC decoding during packet transfer mode does not usually provide enough time to complete BSIC decoding when the MS is in certain multislot configurations. 3GPP TS 45.008 V7.2.0 section 10.1.1.2 states that "In some allowed multislot configurations (see 3GPP TS 45.002) the MS is not able to perform BSIC decoding or multi-RAT measurements. In this case, the MS may skip the last transmission burst in the frame immediately preceding the idle frame or skip the first reception burst in the frame immediately following the idle frame in order to comply with the requirement to search, verify and decode BSIC information, or in order to perform multi-RAT measurements." Skipping a transmission burst in accordance with 3GPP TS 45.008 V7.2.0 section 10.1.1.2 is sometimes referred to as "extending a search window."

Extending the search window by skipping a transmission burst, however, necessarily means that some data transmission is skipped. In certain situations, this may corrupt the transmission of the entire radio block containing the skipped burst. Thus, there is an opportunity to reduce the risk of corrupting the radio block with the skipped burst while maintaining compliance with the requirement to search, verify, and decode BSIC information. The various aspects, features and advantages of the disclosure will become more fully apparent to those having ordinary skill in the art upon careful consideration of the following Drawings and accompanying Detailed Description.

DETAILED DESCRIPTION

A multislot packet data transfer method for a mobile station in an allowed multislot configuration not able to perform normal Base Station Identification Code (BSIC) decoding skips a last transmission burst in a frame immediately preceding an idle frame in accordance with known extended search window techniques and also alters a transmission of a radio block on a last transmission timeslot in a block period immediately preceding the idle frame. The transmission can be altered by completely skipping transmission of the radio block, by replacing the radio block on the last transmission timeslot with a dummy block (made up of one or more dummy bursts), by changing a transmission power level of that radio block, and/or by using a different coding scheme for that radio block.

Additionally, the method contemplates various criteria for determining when to alter the radio block on a last transmission timeslot in a block period immediately preceding the idle frame. Criteria include: whether an unacknowledged radio link control mode is used by the mobile station, whether a robust coding scheme is used, whether there is a low path loss criterion parameter C1, whether there is a high uplink block error rate, whether there is a high downlink interference ratio, and/or whether there is a low downlink received signal level.

Figure 1:
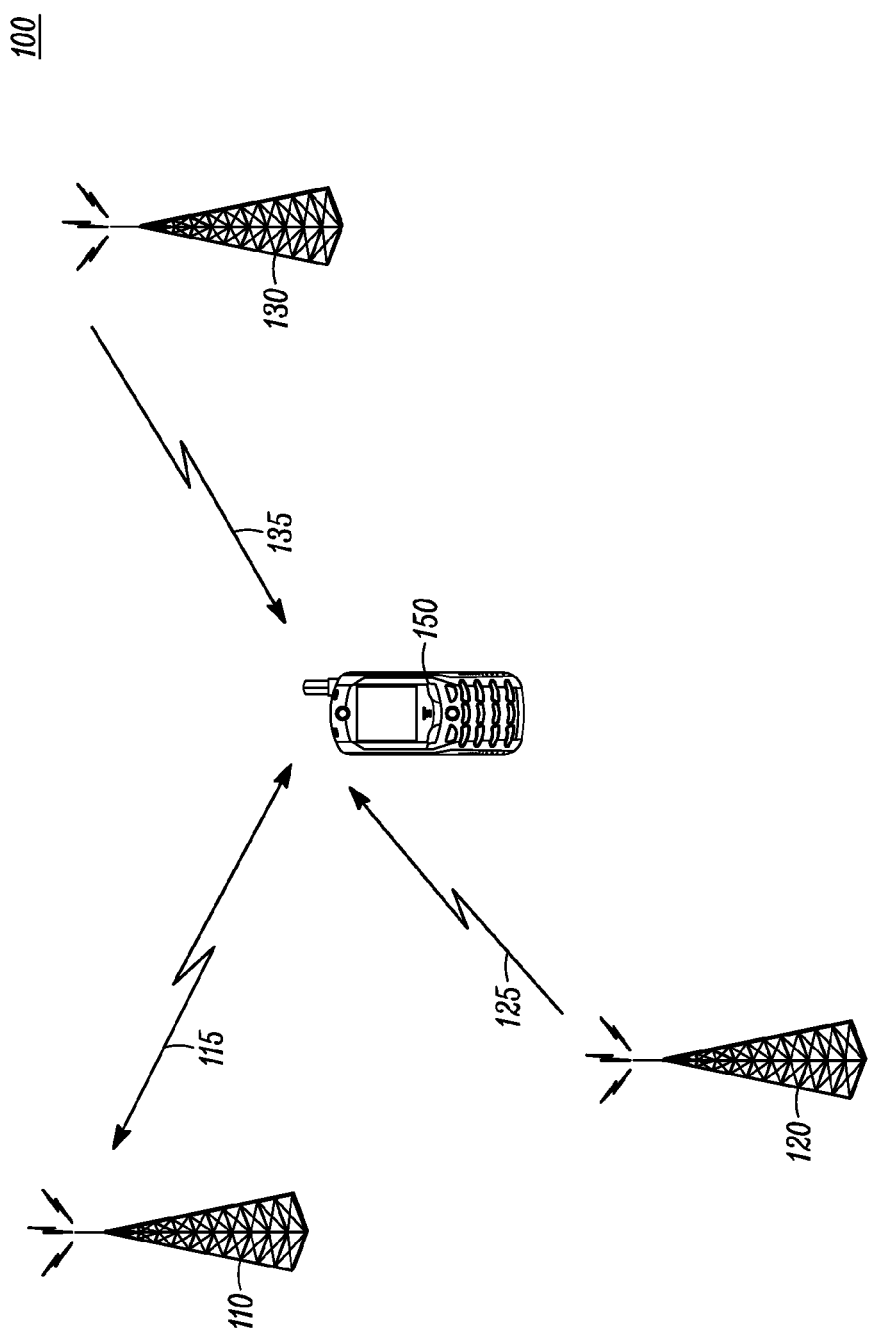
FIG. 1 shows a wireless communication network having a mobile station with at least one serving cell and at least one adjacent cell in accordance with an embodiment of the multislot packet data transfer method.

FIG. 1 shows a wireless communication network 100 having a mobile station 150 with at least one serving cell 110 and at least one adjacent cell 120, 130 in accordance with an embodiment of the multislot packet data transfer method. The mobile station 150 is shown here as a cellular telephone, but the mobile station can alternately be implemented as a portable computer with a wireless connection, a personal digital assistant with a cellular transceiver, or the like. The wireless communication network 100 is shown here as a GSM/EDGE (Global System for Mobile communications/Enhanced Data rate for GSM Evolution) wireless network; however, the wireless communication network 100 can alternately be implemented as another type of time division multiplex access network such as TDMA and other implementations of GSM including future implementations.

Indicated by a two-way signal 115, the mobile station 150 is transmitting and receiving packet data from its serving cell 110. In this embodiment, the signal 115 indicates a multislot packet data transfer. Also, the mobile station 150 is periodically performing BSIC decoding during a neighboring cell search window where it searches for, synchronizes to, and verifies the identity of adjacent cells in order to ensure mobility capability. In this situation, an adjacent cell 120 broadcasts the necessary information for BSIC decoding on signal 125 and another adjacent cell 130 broadcasts the necessary information for BSIC decoding on signal 135. Although two adjacent cells 120, 130 are shown, the number of adjacent cells can be generalized to be zero, one, or more.

Figure 2:
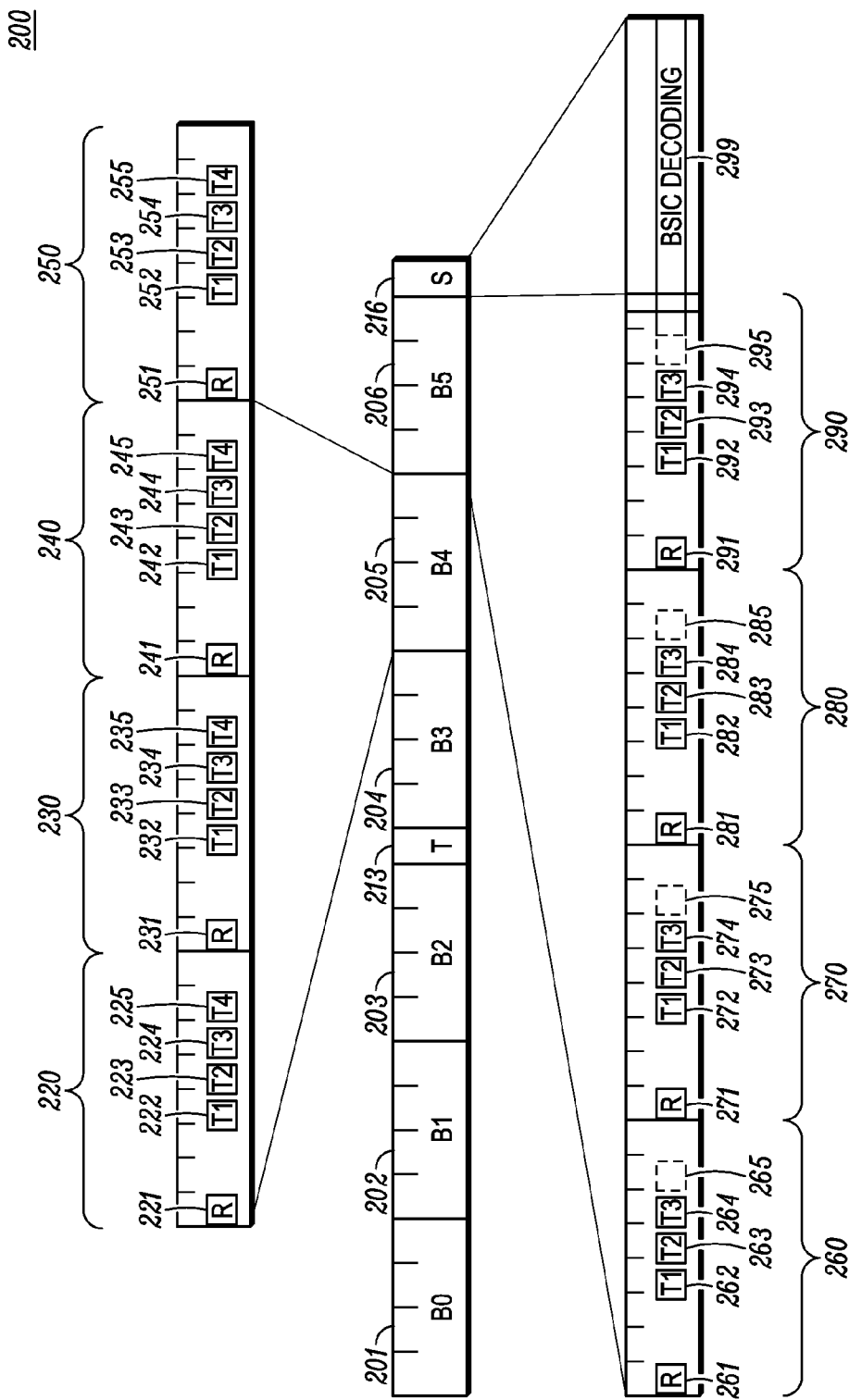
FIG. 2 shows a sample 26-frame multiframe implementing an embodiment of the multislot packet data transfer method in the wireless communication network shown in FIG. 1.

FIG. 2 shows a sample 26-frame multiframe 200 implementing an embodiment of the multislot packet data transfer method in the wireless communication network 100 shown in FIG. 1. The multiframe 200 has 26 Time Division Multiple Access (TDMA) frames. In this sample multiframe 200, not only is the last transmission burst 295 in the frame 290 immediately preceding the idle frame 216 skipped in accordance with 3GPP TS 45.008 V7.2.0 section 10.1.1.2, but the last transmission burst 265, 275, 285, 295 of each of the frames 260, 270, 280, 290 in the block 206 preceding the idle frame 216 is skipped. Skipping the last transmission burst 265, 275, 285, 295 in all the frames 260, 270, 280, 290 composing the block period 206 immediately preceding the idle frame 216, essentially skips the transmission of the entire radio block and improves the uplink data transfer performance of a mobile station when the uplink coding scheme of the mobile station 150 shown in FIG. 1 is such that decoding is not reliable or not possible when less than all of the expected bursts of that radio block are received.

The multiframe 200 is represented as a 26-multiframe for use on a GSM/EDGE Packet Data Traffic CHannel (PDTCH). It must be noted that the multiframe used to support packet data traffic and control channels is in fact a 52-frame multiframe, having two 26-frame multiframes, and we consider here the 26-frame multiframe entity for simplicity. It is possible, however, to also apply the multislot packet data transfer method to other types of multiframes. The sample multiframe 200 has three block periods 201, 202, 203 followed by a frame 213 that can be used to send or receive any signals on the Packet Timing advance Control CHannel (PTCCH). Then follows three more block periods 204, 205, 206 and an idle frame 216 (sometimes referred to as a search frame). Each block period 201, 202, 203, 204, 205, 206 has four TDMA frames, and each frame has eight timeslots generally numbered 0-7.

In FIG. 2, all the timeslots of the two block periods 205, 206 immediately preceding the idle frame 216 have been detailed. In the B4 block period 205, each frame 220, 230, 240, 250 has eight timeslots as shown by the hatch marks at the top of each frame. In this example, the mobile station 150 shown in FIG. 1 has been allocated four transmission timeslots T1, T2, T3, and T4 and one reception timeslot R for each block period 201, 202, 203, 204, 205, 206. Because GSM systems use interleaving to protect against burst errors, a mobile station transmits a single radio block using the same timeslot (e.g., T1) in each frame of a single block period (e.g., B4). Thus, a single radio block is transmitted using the four T1 transmission timeslots 222, 232, 242, 252 in each frame 220, 230, 240, 250 of the B4 block period 205. Another radio block is transmitted using data bursts during the four T2 transmission timeslots 223, 233, 243, 253 in each frame 220, 230, 240, 250 of the B4 block period 205. A third radio block is transmitted using data bursts on each T3 transmission timeslot 224, 234, 244, 254 of the B4 block period 205. And a fourth radio block is transmitted using the T4 transmission timeslots 225, 235, 245, 255. Note that the details of the B4 block period 205 are applicable to all the preceding block periods 201, 202, 203, 204 in the multiframe 200.

In some coding schemes, a data burst must be sent on the assigned timeslot of all the frames of a block period in order to properly send a radio block. In fact, with some coding schemes it is impossible to decode a radio block when a data burst is missing! For example, the CS4 coding scheme (GPRS), MCS-3, MCS-4, MCS-7, MCS-8, and MCS-9 modulation and coding scheme (EDGE) require reception of all the data bursts in a block period in order to properly decode the radio block. Thus, when the last transmission burst 295 in the frame 290 immediately preceding the idle frame 216 is skipped in accordance with 3GPP TS 45.008 V7.2.0 section 10.1.1.2, then the entire radio block on the T4 timeslots 265, 275, 285, 295 of the B5 block period 206 is corrupted when using certain coding schemes. Note that other coding schemes may not necessarily produce a corrupted radio block when a transmission burst is skipped, but skipping a transmission burst may still result in a corrupted radio block due to other factors such as noise and other types of interference. Coding schemes that are "more" robust can withstand more missing data bursts than coding schemes that are marginally robust. Of course, coding schemes that are not robust cannot withstand any missing data bursts.

So instead of skipping only the last transmission burst 295 in the frame 290 immediately preceding the idle frame 216, the highest numbered Packet Data CHannel (PDCH) with bursts 265, 275, 285, 295 in the block period 206 immediately preceding the idle frame 216 is altered or skipped under certain circumstances. Thus, a single radio block is transmitted using the four T1 transmission timeslots 262, 272, 282, 292 in each frame 260, 270, 280, 290 of the B5 block period 206. Another radio block is transmitted using data bursts during the four T2 transmission timeslots 263, 273, 283, 293 in each frame 260, 270, 280, 290 of the B5 block period 206. And a third radio block is transmitted using data bursts on each T3 transmission timeslot 264, 274, 284, 294 of the B5 block period 206. Notice that the radio block transmitted on the highest numbered PDCH 265, 275, 285, 295 immediately preceding the idle frame 216 has been skipped. Although the non-final T4 transmission timeslots 265, 275, 285 are not used, the final T4 transmission timeslot 295 is reallocated to extend the search window to perform BSIC decoding 299 in accordance with 3GPP TS 45.008 V7.2.0 section 10.1.1.2.

Figure 3:
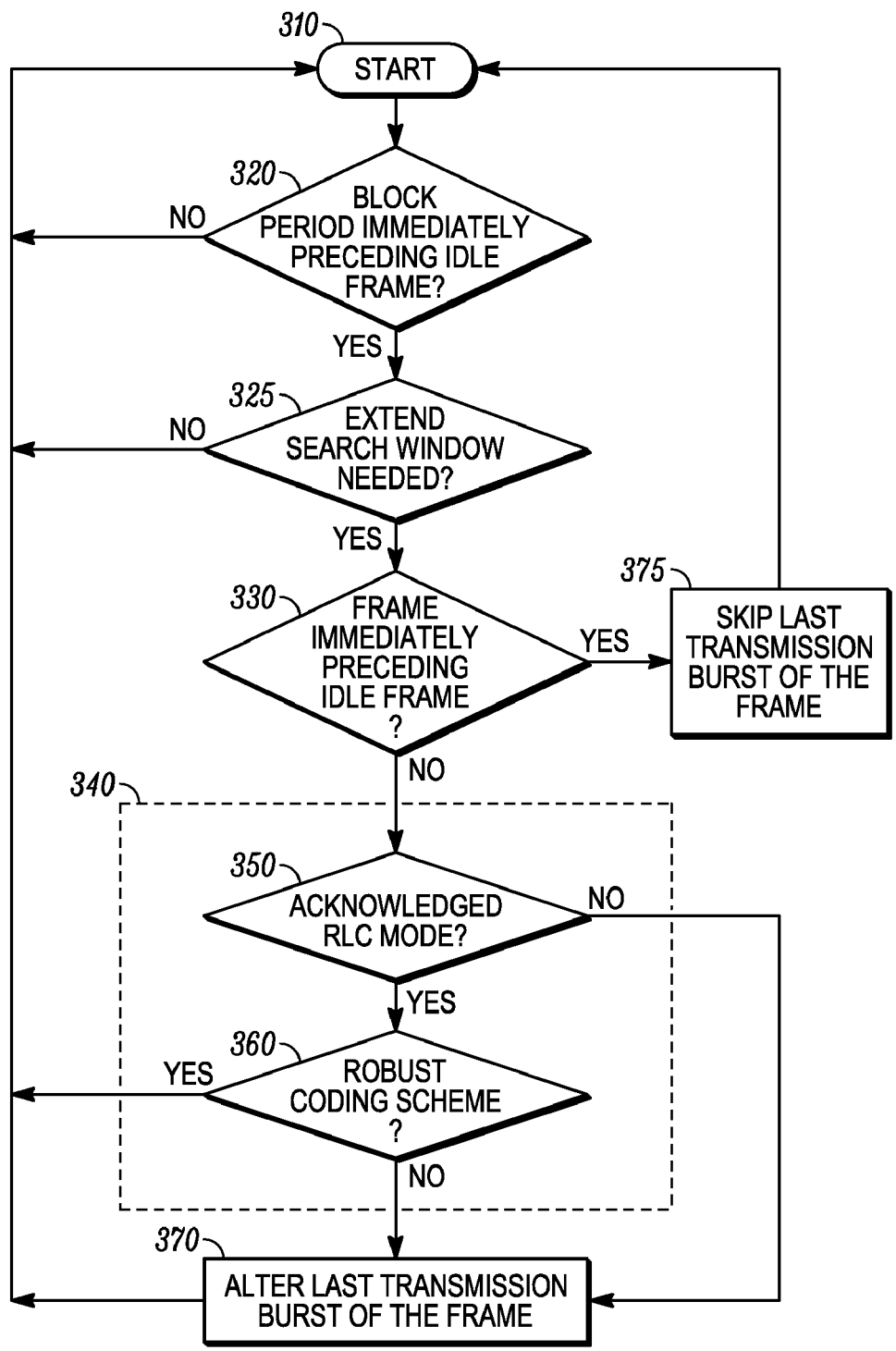
FIG. 3 shows a flowchart of an embodiment of the multislot packet data transfer method.

FIG. 3 shows a flowchart 300 of an embodiment of the multislot packet data transfer method. This flowchart can be implemented in a mobile station (such as mobile station 150 shown in FIG. 1) using software programs running on a microprocessor. After the start step 310 where the mobile station is in an allowed multislot configuration but is not able to perform normal BSIC decoding during the confines of an idle frame, the mobile station determines if it is processing in a block period immediately preceding an idle frame. Referencing FIG. 2, decision step 320 would return "YES" if the mobile station is preparing to transmit during the B5 block period 206 and go to step 325. Otherwise, the decision step 320 would follow the "NO" path and return to the start step 310.

Next, step 325 determines if the search window should be extended in accordance with 3GPP TS 45.008 V7.2.0 section 10.1.1.2. If BSIC decoding or multi-RAT measurements can be completed during the time period of the upcoming idle frame, then extension of the search window is not needed and the flow returns to the start block 310. If, however, BSIC decoding or multi-RAT measurements cannot be completed during the time period of the upcoming idle frame, then an extended search window is needed. Note that step 325 can be determined on a multiframe-by-multiframe basis with a first determination for a multiframe being consistent for the remaining frames in the multiframe. There are some situations where an extended search window is not needed (e.g., when the SCH position of a neighbor cell is located inside the idle frame) and there are other situations where an extended search window is of great assistance (e.g., during FCCH search or when the SCH position of a neighbor cell cross the boundary of the idle frame). Thus, depending on the neighbor cell relative timing (and the number of neighbor cells), there could be some periods if time where an extended search window is not needed and other periods of time where a need for an extended search occurs frequently.

Next, the mobile station determines if it is processing a frame immediately preceding the idle frame. Referencing FIG. 2, decision step 330 would return "YES" if the mobile station is preparing to transmit during the frame 290 immediately preceding the idle frame 216. Then, the flow would go to step 375 and skip the last transmission burst of the frame in accordance with 3GPP TS 45.008 V7.2.0 section 10.1.1.2 before returning to the start step. Otherwise, the decision step 330 would follow the "NO" path and continue to step 340.

Step 340 determines when transmission of the radio block on the highest numbered PDCH immediately preceding the idle frame should be altered. Deciding when to alter a burst in a non-final frame is implementation-specific and depends on the circumstances where a designer has determined an appropriate trade-off between data corruption and data transfer speed and may also include current drain considerations. In this flowchart, step 340 is implemented using two decision steps 350, 360. In step 350, the mobile station determines if the mobile station is operating in an acknowledged RLC mode. If the mobile station is operating in an acknowledged RLC mode, the flow goes to step 360 where the mobile station determines whether the coding scheme being used is a robust coding scheme. A robust coding scheme is a coding scheme where, from a purely signal processing point of view, a radio block can be decoded even when a burst is missing. If step 360 determines that the coding scheme is a robust coding scheme, then the flow returns to start step 310.

If, however, the mobile station determines that it is not operating in an acknowledged RLC mode in step 350, or is not transmitting using a robust coding scheme in step 360, then the mobile station will alter the last transmission burst of the frame in accordance with step 370 by skipping it. By skipping the last transmission burst in the frame immediately preceding the idle frame and in all other frames in the block period immediately preceding the idle frame under certain circumstances, the multislot packet data transfer method avoids situations that would result in an unacceptable trade-off between data corruption and transfer speed. Note that even if a robust coding scheme is used, channel conditions may be adverse such that skipping only the last transmission burst of a frame immediately preceding an idle frame (i.e., transmitting a burst during a highest numbered transmission timeslot of a non-final frame in a block period immediately preceding the idle frame) may still result in a corrupted radio block.

In addition to the two diagrammed criteria of (1) whether the mobile station is in an RLC acknowledged (or unacknowledged) mode and (2) the robustness of the coding scheme commanded by the network, additional or alternate criteria that can be used as decision criteria when implementing step 340 include: a low path loss criterion parameter C1, a high uplink block error rate, a high downlink interference ratio, and a low downlink received signal level. As stated previously, any number of criteria in a variety of sequential orders can be used to implement decision step 340 so that the risk of radio block corruption is acceptable without overly reducing the data transfer speed.

If it is not desirable to skip the last transmission bursts of the non-final frames of the block immediately preceding the idle frame, the last transmission bursts in the non-final frames can be altered to be dummy bursts or placeholder bursts holding no useful data. While this variation does not cause a decrease in current drain like skipping a transmission burst does, it maintains the previously-described benefits of improved data transfer performance. Alternately, the last transmission burst of the non-final frames can be altered by increasing the uplink transmission power so as to improve the probability of the network decoding the block despite the fact that the burst in the final frame is missing. Another alteration is to change the coding scheme of the last bursts in the non-final frames of the block immediately preceding the idle frame. This changing of the coding scheme could be implemented in conjunction with an increase in uplink transmission power.

Figure 4:
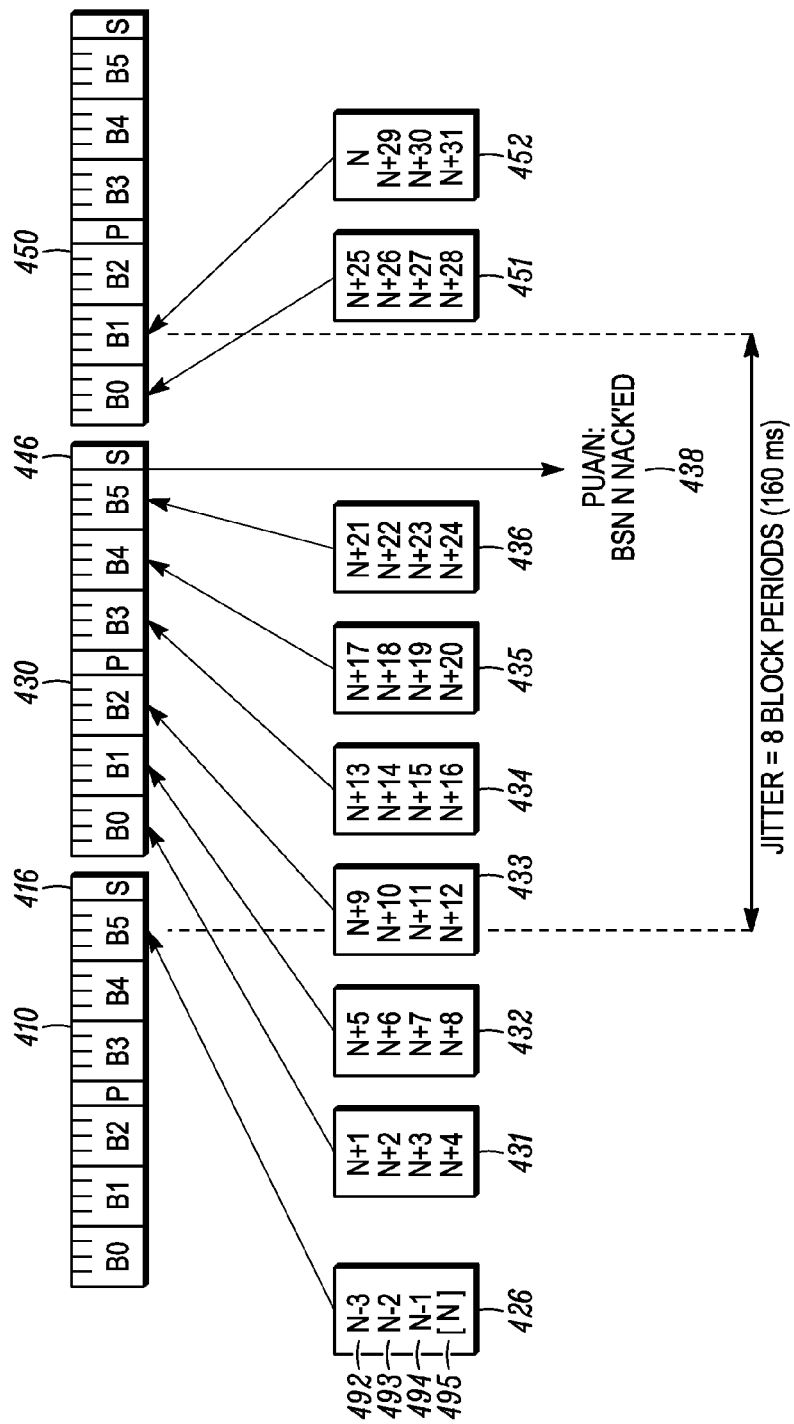
FIG. 4 shows three prior art 26-frame multiframes with the last transmission burst in the frame immediately preceding the idle frame skipped and the recovery of that skipped burst using an acknowledged Radio Link Control (RLC) mode.
Figure 5:
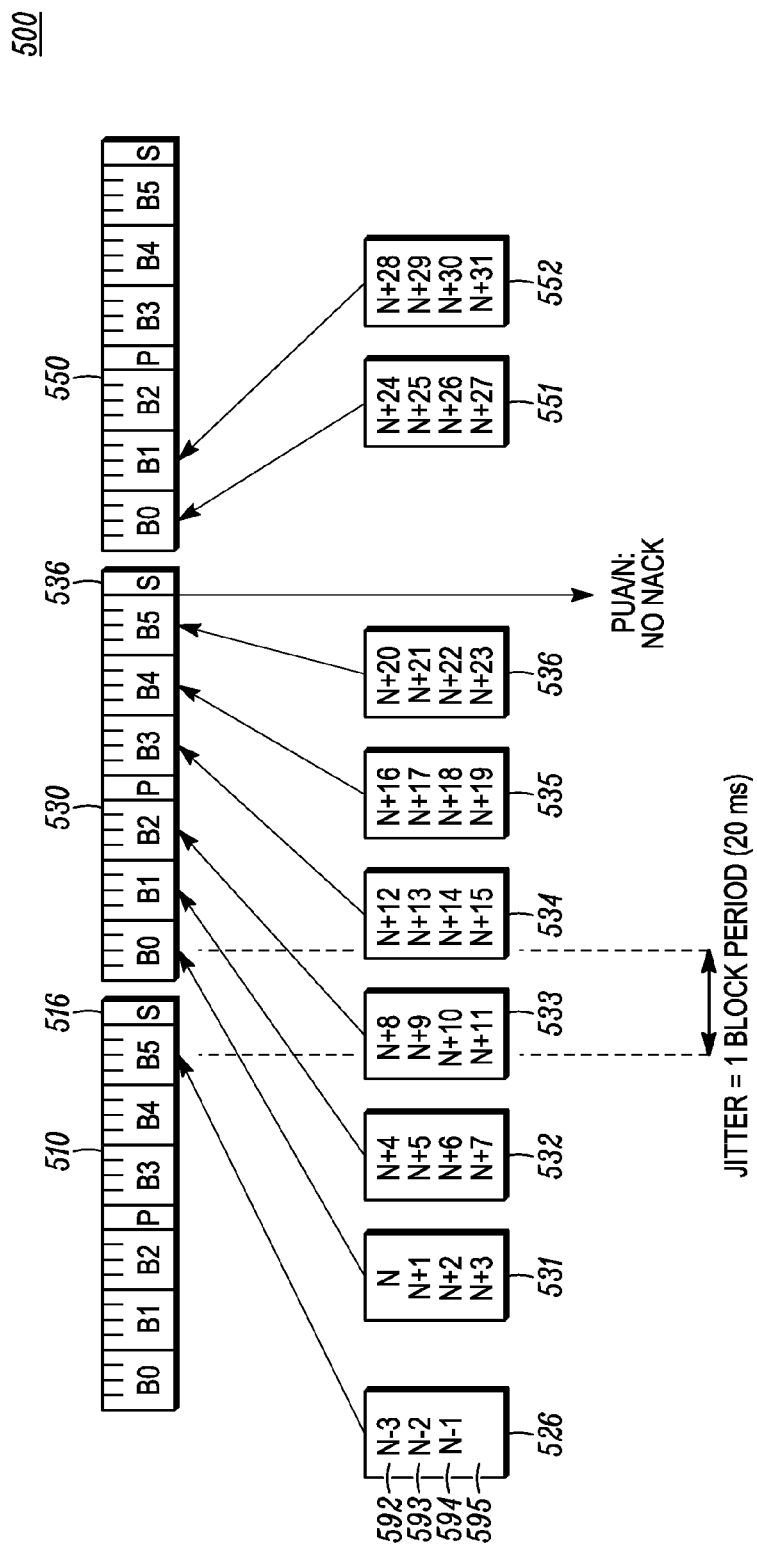
FIG. 5 shows three 26-frame multiframes implementing an embodiment of the multislot packet data transfer method.

FIG. 4 and FIG. 5 are shown to compare situations where a mobile station (e.g., mobile station 150 in FIG. 1) is transmitting packet data on four uplink transmission timeslots in an acknowledged RLC mode using a non-robust coding scheme and either (FIG. 4) skipping only the last transmission burst in the frame immediately preceding the idle frame, and the recovery of the resulting corrupted radio block, or (FIG. 5) skipping the transmission of the radio block on the last transmission timeslot in the block period immediately preceding the idle frame.

FIG. 4 shows three prior art 26-frame multiframes 410, 430, 450. In the first multiframe 410, the last transmission radio block [N] 495 in the block period 426 immediately preceding the idle frame 416 is corrupted due to a skipped last transmission burst in the frame immediately preceding the idle frame 416. Because the coding scheme is not robust, skipping the last transmission burst in the frame immediately preceding the idle frame 416 automatically insures that the last radio block will not be decoded. The other radio blocks 492, 493, 494 are properly decoded.

In the second multiframe 430, all the radio blocks during all the block periods 431, 432, 433, 434, 435, and 436 are completely transmitted and properly decoded. Note that, for the sake of simplicity, the last transmission burst in the frame immediately preceding the idle frame 446 of the second multiframe 430 has not been skipped; for example, no BSIC action is required during this specific idle frame or there is no need to extend the search window.

Because the mobile station is operating in an acknowledged RLC mode, the mobile station (e.g., mobile station 150 in FIG. 1) receives a Packet Uplink Ack/Nack (PUA/N) message 438 from the serving base station (e.g., base station 110 in FIG. 1) indicating that radio block N 495 could not be decoded. At the next opportunity, the mobile station resends the radio block N, which in this situation is during the second block period 452 of the third multiframe 450.

Because in this example the base station must wait eight block periods 431, 432, 433, 434, 435, 436, 451, 452 after receiving the radio block N−1 in order to properly receive the radio block N, the jitter is eight block periods. With a block period of 20 milliseconds (ms), the jitter is a total of 160 ms. Note that the jitter depends on the network configuration in general, and the time for Negatively acknowledging (Nacking) a given block in particular (at least the value of the BS_CV_MAX parameter broadcast on the serving cell, increased by the time to send the next scheduled acknowledgment message), and the jitter also depends on the time for the mobile station to parse the acknowledgment message, prepare the retransmission and transmit it on the air interface (typically 2 block periods).

FIG. 5 shows three 26-frame multiframes 510, 530, 550 implementing an embodiment of the multislot packet data transfer method. Because the transmission of the radio block 595 on the last transmission timeslot in the block period 526 immediately preceding the idle frame 516 of the first multiframe 510 is skipped, no radio block is corrupted and no retransmission is needed for radio block N.

In the last block period 526 before the idle frame 516 in the first multiframe 510, the first three radio blocks 592, 593, 594 are transmitted and the final radio block 595 is altered. For example, the altered radio block is skipped and not transmitted on the interleaved data bursts 265, 275, 285, 295 during timeslot T4 of the block period 206 shown in FIG. 2. Instead, the skipped radio block is transmitted during the next available block period 531. The mobile station continues to transmit during the assigned timeslots of further block periods 532, 533, 534, 535, 536 of the second multiframe 530. Again, for the sake of simplicity, the last transmission burst in all the frames immediately preceding the idle frame 536 of the second multiframe 530 has not been skipped.

Because radio block N was sent during the next block period 531 instead of the previous block period 526, it was not corrupted by a missing data burst and no NACK is received. In the third multiframe 550, the remaining radio blocks are transmitted during the block periods 551, 552 shown.

As shown in FIG. 4 and FIG. 5, the same radio blocks N−3 to N+31 can be transmitted during the last block 526 of the first multiframe 510 to the second block 522 of the third multiframe 550. Using the multislot packet data transfer method in the example shown, the jitter caused by a missing transmission burst is reduced from 160 ms to 20 ms. Note that if the mobile station was using a non-robust coding scheme and was operating in an unacknowledged RLC mode without the benefit of an implementation of the multislot packet data transfer method, the radio block N would be irretrievably corrupted. If every multiframe skipped only the last transmission burst in the frame immediately preceding the idle frame (e.g., the last transmission burst in the frame 436 immediately preceding the idle frame 446 was skipped, thus also corrupting radio block N+24), then the negative impact of the data burst loss would be even greater. In contrast, if the mobile station was using a non-robust coding scheme and was operating in an unacknowledged RLC mode with the benefit of an implementation of the multislot packet data transfer method, no radio blocks would be corrupted and the transmission would suffer only from mild jitter.

In the implementation shown in FIG. 3, if the mobile station is operating in an acknowledged RLC mode and the coding scheme is considered robust, the risk of radio block corruption is acceptable and the mobile station transmits on the last transmission burst of a non-final frame. In contrast, if the coding scheme was not robust and the mobile station were to transmit on the last transmission burst of a non-final frame, the radio block would be corrupted, the current drain used during those last transmission bursts during a non-final frame would have been wasted, and the mobile station would be requested to re-transmit that radio block—resulting in increased jitter.

Thus, the multislot packet data transfer method alters transmission bursts that will result in corrupted radio blocks when using the extended search window. The alteration reduces wasted current drain caused by skipping transmission bursts that will result in corrupted radio blocks, reduces jitter caused by radio block re-transmissions when a mobile station is operating in an acknowledged RLC mode, and/or enables improved data transfer performance While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

We claim:

1. A multislot packet data transfer method for a mobile station in an allowed multislot configuration not able to perform normal Base Station Identification Code (BSIC) decoding comprising:
   skipping a last transmission burst in a frame immediately preceding an idle frame; and
   altering transmission in all other frames of a radio block on a last transmission timeslot, wherein the frame and the all other frames compose a block period immediately preceding the idle frame.

2. A multislot packet data transfer method as recited in claim 1 wherein the altering comprises:
   skipping transmission of the radio block on the last transmission timeslot.

3. A multislot packet data transfer method as recited in claim 1 wherein the altering comprises:
   replacing the transmission of the radio block on the last transmission timeslot with the transmission of at least one dummy burst.

4. A multislot packet data transfer method as recited in claim 1 wherein the altering comprises:
   changing a transmission power level of the radio block on the last transmission timeslot.

5. A multislot packet data transfer method as recited in claim 4 wherein the changing the transmission power level comprises increasing the transmission power level.

6. A multislot packet data transfer method as recited in claim 1 wherein the altering comprises:
   using a different coding scheme for the radio block on the last transmission timeslot.

7. A multislot packet data transfer method as recited in claim 6 wherein the different coding scheme is more robust.

8. A multislot packet data transfer method as recited in claim 1 wherein the idle frame includes a neighboring cell search window.

9. A multislot packet data transfer method as recited in claim 1 further comprising:
   determining whether the mobile station is processing a non-final frame in a block period immediately preceding an idle frame; and
   evaluating whether to alter a last transmission burst of all other frames of a radio block that compose the block period.

10. A multislot packet data transfer method according to claim 9 wherein the altering comprises:
   altering the last transmission burst of all other frames of a radio block that compose the block periods if the step of evaluating concludes to alter the last transmission burst of all other frames of a radio block that compose the block period.

11. A multislot packet data transfer method according to claim 9 wherein the evaluating comprises:
   ascertaining that an unacknowledged radio link control mode is in use.

12. A multislot packet data transfer method according to claim 9 wherein the evaluating comprises:
   ascertaining that a non-robust coding scheme is in use.

13. A multislot packet data transfer method according to claim 9 wherein the evaluating comprises:
   ascertaining that there is a low path loss criterion parameter C1.

14. A multislot packet data transfer method according to claim 9 wherein the evaluating comprises:
   ascertaining that there is a high uplink block error rate.

15. A multislot packet data transfer method according to claim 9 wherein the evaluating comprises:
   ascertaining that there is a high downlink interference ratio.

16. A multislot packet data transfer method according to claim 9 wherein the evaluating comprises:
   ascertaining that there is a low downlink received signal level.

* * * * *